United States Patent

[11] 3,601,479

[72] Inventor Yoshio Komine
Saitama-ken, Japan
[21] Appl. No. 852,044
[22] Filed Aug. 21, 1969
[45] Patented Aug. 24, 1971
[73] Assignee Canon Kabushiki Kaisha
Tokyo, Japan
[32] Priority Aug. 28, 1968, Aug. 30, 1968
[33] Japan
[31] 43/73,679 and 43/74,476

[54] CINE CAMERA HAVING FILM COUNTER
7 Claims, 7 Drawing Figs.
[52] U.S. Cl. ............................................. 352/72,
52/172
[51] Int. Cl. ................................................. G03b 23/02
[50] Field of Search ............................................ 352/72, 74,
78, 170–172; 95/31

[56] References Cited
UNITED STATES PATENTS
3,011,419 12/1961 Takahama ................. 352/74 X
3,206,758 9/1965 Inglis ........................... 352/172
3,297,397 1/1967 Grant et al. .................. 352/172
3,474,714 10/1969 Bihlmaier et al. ............ 352/72 X
3,488,112 1/1970 Hickl ........................... 352/72

Primary Examiner—Donald O. Woodiel
Attorney—Anton J. Wille

ABSTRACT: A cine camera is provided with a film footage counter which is automatically coupled and uncoupled with the film-advancing mechanism of the camera as a film magazine is loaded and unloaded from the camera film chamber. A film-driving shaft with its axis normal to the direction of loading and unloading operations and extending into the camera film chamber, is mounted within the camera on a biased pivoted member, the insertion or withdrawal of the film magazine retracting the film-winding shaft; the biased member coupling the shaft to the magazine driving core when the film magazine is in place. A film footage indicator operative with the film-driving shaft is provided with resilient means for returning the indicator to a zero reading position upon retraction of the film-winding shaft from the camera body.

CINE CAMERA HAVING FILM COUNTER

This invention relates to a cine camera provided with a film counter.

In conventional cine cameras in which a film magazine is loaded from the rear of the camera into a magazine chamber, a mechanism for retracting the film-winding shaft provided in the camera body from the magazine chamber and a mechanism to restore a film-counting device to its zero position were separately provided.

An object of the present invention is to provide a cine camera of the type as mentioned above, in which a film magazine is inserted into the magazine chamber of the camera in the direction perpendicular to the axis of a film-winding shaft provided in the camera body, and wherein the film-winding shaft is retracted from the film chamber when the film magazine is loaded in or unloaded from the magazine chamber, and a film footage counter is returned to its zero position simultaneously with the retracting movement of the film-winding shaft.

According to one aspect of the present invention the film-winding shaft is retracted from the magazine chamber by the film magazine with at the loading or unloading operation of the magazine.

According to another aspect of the present invention the film-winding shaft is retracted from the magazine chamber when the cover for the magazine chamber is opened as the magazine is loaded or unloaded.

According to further aspect of the present invention, means for retracting the film-winding shaft bears an index lever for a film counter in such a manner that when the film-winding shaft is retracted from the film chamber, the index lever is separated from a mechanism to shift the index lever for return to its zero position.

According to further aspect of the present invention, a disc-type footage counter is provided which is returned to zero position as the film-winding shaft is retracted from the magazine chamber.

The present invention will be more clearly described with respect to illustrative embodiment shown in the attached drawing, in which:

FIG. 2 shows a side view thereof but in this figure the cover is closed, and FIG. 3 shows a longitudinal cross section of the embodiment shown in FIG. 1 as viewed from the rear of the camera;

FIG. 6 is a perspective view similar to FIG. 1 showing another embodiment of the invention, while

Figure 1:
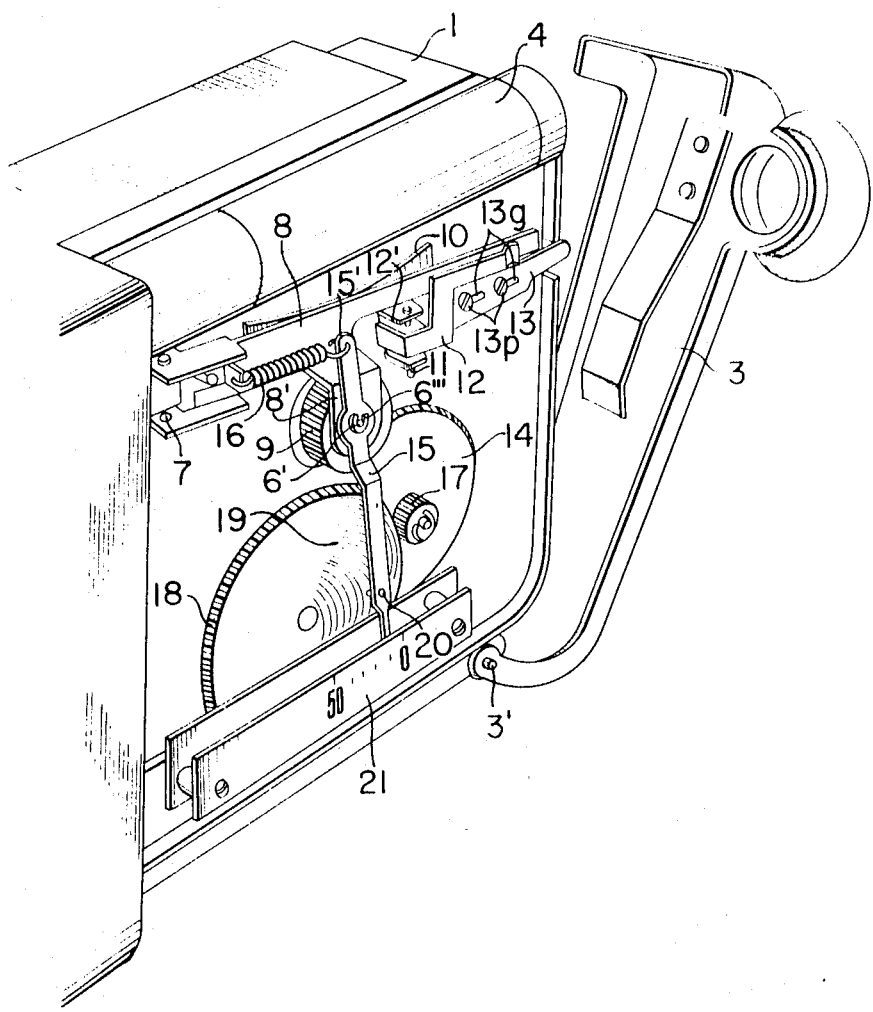
FIGS. 1 through 3 shows a first embodiment of the invention, and FIG. 1 shown a perspective view where the back cover is removed and the cover for the magazine chamber is opened.
Figure 2:
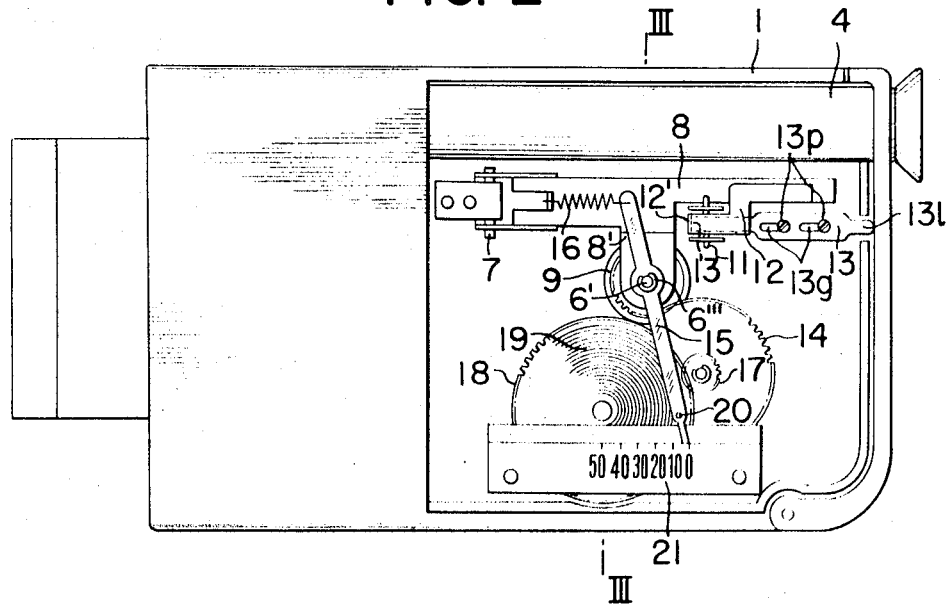
Figure 3:
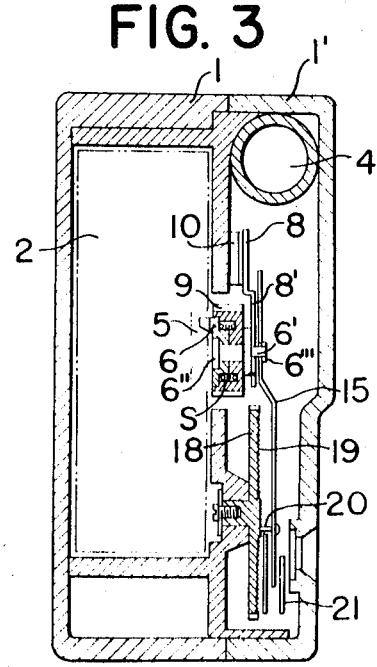

Referring to FIGS. 1-3 wherein a first embodiment of the invention is illustrated, the reference numeral 1 designates a cine camera body provided with a removable side cover 1' (FIG. 3) for the rear side portion of the camera. The camera body 1 is provided with a magazine chamber for receiving a film magazine 2 indicated by the phantom line in FIG. 3. A magazine cover 3 is hinged on pin(s) 3 secured to the lower rear portion of the camera body, the magazine cover being shown open in FIG. 1 during loading of the film magazine into the camera, and closed in FIG. 3 when the magazine is in place within the camera chamber. The film magazine is provided with the usual film-winding core 5 which is adapted to be coupled to a film-winding shaft 6 provided within the camera body. As will hereinafter appear, when the cover is opened for loading or unloading the film magazine 3, the winding shaft 6 is retracted to the right in FIG. 3, to permit insertion or removal of the magazine. With the magazine in place within the chamber, the closing of the rear cover will move the winding shaft inwardly to engage the shaft 6 and the core 5.

Pivoted about a vertically fixed pin 7 in the camera body is a horizontally extending lever 8, the free end of which extends rearwardly of the camera body toward the cover 3. The lever 8 is formed with a dependent, inverted L-shaped portion 8' providing a bearing support for the reduced diameter end 6' of the winding shaft 6. The winding shaft 6 also carries a gear 9 and an index lever 15 to be further described, between its flanged inner end 6'' and a lockwasher 6''' on its outer end, the shaft 6 and the gear 9 being frictionally coupled by means of a springS.

The gear 9 meshes with a gear 4 driven by a motor (not shown) to drive the winding shaft 6.

Secured between the camera body and the lever 8 is a leaf spring 10, the bias of the spring urging the lever outwardly of the camera body about its pivot 7. Pivotally supported about a vertical pin 11 supported on the camera body is an offset crank lever 12, the free end of which is abutted by the free end of the lever 8. Slidably mounted on the camera body and adapted to coact with the crank lever 12 is a plate 13 mounted on spaced pins 13p as by longitudinal slots 13g. The forward end which extends toward the objective end of the camera is adapted to engage the rear bent portion 12' of the crank lever while the rear end is adapted to engage the rear cover 3, the slidable plate 13 being biased toward the cover, or to the right in FIGS. 1 and 3 by a spring (not shown). Thus, when the cover 3 is open as in FIG. 1, the slidable plate 3 is in its extreme right hand position and the lever 8 is biased outwardly by the spring 10 to retract the winding shaft 6. With a film magazine within the camera body and the rear cover closed, the abutment of the rear cover and rear end of the slidable plate 13 will move the plate 13 to the left to abut the crank lever portion 12'. This will rotate the free end of the crank lever inwardly to pivot the lever 8 in the same direction to couple the winding shaft 6 and the magazine core 5 as shown in FIG. 3.

The index lever 15 pivoted on shaft 6 is connected at its upper end 15' to the lever 8 by a spring 16 which biases the lever in a counterclockwise direction about the shaft. The lower end of the index lever is provided with a follower pin 20 which engages a spiral groove formed on a gear 19, the gear 19 meshing with a pinion 17 rotatable with the motor-driven gear 14. As the gear 19 is rotated, the index lever will be pivoted through the pin and groove connection against the bias of the spring 16, the lower end of the lever being read against a suitable counter scale plate 21.

After a film magazine has been exposed, the opening of the rear cover 3 will permit the plate 13 to slide to the right thereby releasing the crank lever 12. The lever 8 being free of the inwardly directed force of the crank lever will be moved outwardly by the spring 10. The outward movement of the lever 8 will retract and uncouple the winding shaft 6 to permit withdrawal of the film magazine. At the same time, the index lever 15 is also moved outwardly to free the pin 20 from the gear grooves 19 to permit the spring 16 to return the index lever to its zero position.

Figure 4:
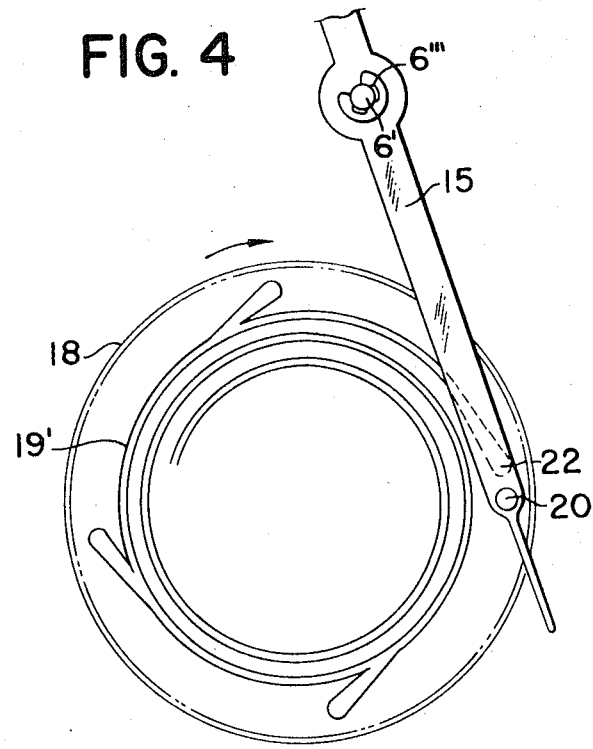
FIG. 4 shows a modification of the film counter used in the first embodiment.
Figure 5:
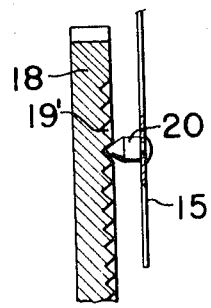
FIG. 5 shows the engagement of the pin of the index lever and the spiral groove on the side surface of the gear.

In FIGS. 4 and 5, a modification of the spiral groove 19 is illustrated in which several entrance grooves 22 are provided for the spiral groove 19' on gear 18. When the peripheral portion of the groove is spiral, the engagement of the index pin with the groove upon exposure of a new magazine may entail the loss of a groove since the angular position of the gear 18 upon completing the exposure of a previous magazine is not constant. With several entrance grooves 22 spaced about the outer periphery of the spiral groove, the pin 20 will enter the nearest entrance groove upon rotation of the gear 18 and then start tracking beginning in the outermost groove of the spiral. FIG. 5 shows the engagement of pin 20 in the spiral groove 19'.

Figure 6:
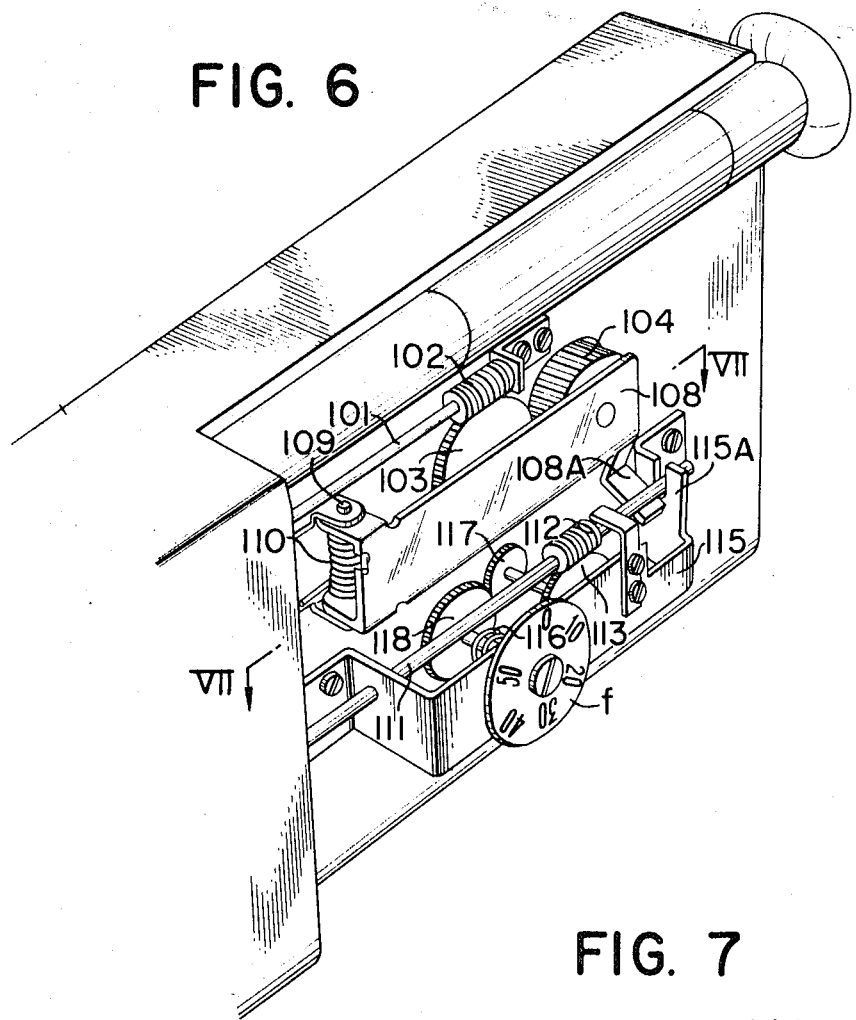
Figure 7:
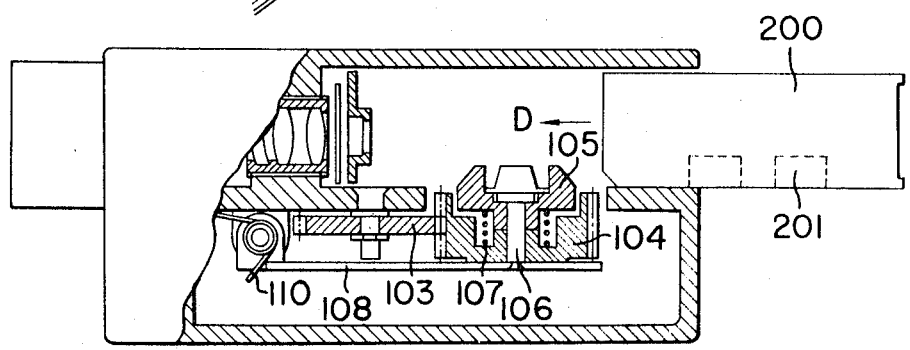
FIG. 7 is a cross-sectional view taken along the line VII—VII of FIG. 6.

In FIGS. 6 and 7 a second embodiment of the invention is illustrated wherein the driving shaft for the magazine core is supported on a pivotable horizontal plate 108 for coupling and uncoupling the driving power of the camera and the magazine core. A motor (not shown) rotates a shaft 101 horizontally supported in the camera body. A worm 102 secured to the shaft meshes with a gear 103. The gear 103 meshes in turn with a gear 104 secured to the winding shaft 106 having in its inner end a clutch face 105 frictionally driven by the shaft through a spring 107. The shaft 106 is supported on the plate 108 pivotally mounted on a vertical pin 109 secured in the camera body. A spring 110 about the pin 109 biases the plate counterclockwise (FIG. 7) or inwardly for engagement with the magazine core 201. A footage counter $f$ in the form of a disc is also provided on a frame 115, the counter $f$ being rotated from a camera driven shaft 111 through worm 112, gears 113 and 117, and gear 118. A spring 116 is provided for the counter $f$ for biasing the same clockwise toward its zero setting.

When the film magazine 200 is inserted into the camera body, it cams the clutch face 105 downwardly in FIG. 7 to rotate the plate 108 clockwise against the bias of spring 110 to retract the shaft 106. With the magazine in place, the spring 110 will return the plate 108 to couple the clutch face 105 and magazine core 201. With the removal of the magazine 201, the plate 108 is rotated clockwise to again retract the shaft 106. An extension 108A on the free end of plate 108 lifts the end of the shaft 111 in slot 115A of the frame 115 against the bias of a leaf spring 114 on the frame to free the gear 113. This permits the spring 116 to return the indicator $f$ to its zero position.

I claim:

1. A cine camera, comprising
a camera body,
a film chamber within the camera body for receiving a film magazine loaded from the rear of the camera opposite the camera objective,
a cover for the film chamber,
a film-winding shaft provided in the camera body extending into the film chamber and having an axis perpendicular to the loading direction of the film magazine,
means for retracting the film-winding shaft from the film chamber when the magazine is loaded and unloaded, and
a film footage counter having a resilient means biased by the retracting means to restore the counter to its zero position when the film-winding shaft is retracted from the film chamber by the retracting means.

2. A cine camera according to claim 1, including a mechanism operated by the opening and closing of the film chamber cover for actuating the retracting means.

3. A cine camera according to claim 1, in which the retracting means is directly actuated by the film magazine as it is loaded or unloaded.

4. A cine camera according to claim 1, in which the film footage counter is a disc-type footage counter.

5. A cine camera according to claim 1, in which the film footage counter includes an index lever, a spring normally biasing the index lever to a zero footage position, a pin on the index lever, a rotatable element rotatable with the film-winding shaft, a spiral groove provided on the rotatable element and engaged by the index lever pin when the film magazine is within said chamber and said film-winding shaft extends into the film chamber, said index lever pin being disengaged when the retracting means retracts the film-winding shaft to permit said spring to return the lever to its zero position.

6. A cine camera according to claim 5, in which the outermost groove of the spiral groove being provided with a plurality of entrance grooves for the index lever pin.

7. A cine camera according to claim 1, wherein the film footage counter includes a driven disc advanced with the film-winding shaft and wherein a spring biases the disc to a zero position, and means for releasing the driven disc when said retracting means retracts the film-winding shaft to permit said spring to rotate said disc to its zero position.